US012606235B2

(12) United States Patent
Wang et al.

(10) Patent No.: US 12,606,235 B2
(45) Date of Patent: Apr. 21, 2026

(54) DUAL-MODE ACTIVE REAR-WHEEL STEERING DEVICE BASED ON DIFFERENTIAL PRINCIPLE

(71) Applicant: Jilin University, Changchun (CN)

(72) Inventors: Junnian Wang, Changchun (CN); Dongxu Fu, Changchun (CN); Shuo Zhuang, Changchun (CN); Kefu Zhu, Changchun (CN); Chunlin Zhang, Changchun (CN)

(73) Assignee: Jilin University, Changchun City (CN)

( * ) Notice: Subject to any disclaimer, the term of this patent is extended or adjusted under 35 U.S.C. 154(b) by 800 days.

(21) Appl. No.: 18/064,681

(22) Filed: Dec. 12, 2022

(65) Prior Publication Data

US 2023/0145223 A1 May 11, 2023

(30) Foreign Application Priority Data

Jan. 4, 2022 (CN) .......................... 202210001614.6

(51) Int. Cl.
*B62D 5/04* (2006.01)
*B62D 7/15* (2006.01)

(52) U.S. Cl.
CPC ........... *B62D 5/043* (2013.01); *B62D 5/0421* (2013.01); *B62D 7/1581* (2013.01)

(58) Field of Classification Search
CPC ...... B62D 5/043; B62D 5/0478; B62D 5/046; B62D 5/0463; B62D 5/0421; B60K 17/046; B60K 17/24; B60K 17/30
See application file for complete search history.

(56) References Cited

U.S. PATENT DOCUMENTS

| | | | | |
|---|---|---|---|---|
| 5,554,969 | A | * | 9/1996 | Eguchi ............... B62D 15/0225 |
| | | | | 180/404 |
| 6,024,182 | A | * | 2/2000 | Hamada ................. B60K 6/365 |
| | | | | 903/910 |
| 8,554,416 | B2 | * | 10/2013 | Horiuchi ............... B62D 7/159 |
| | | | | 701/42 |

(Continued)

FOREIGN PATENT DOCUMENTS

| | | | | |
|---|---|---|---|---|
| CN | 207931390 | U | * | 10/2018 |
| CN | 110171472 | A | * | 8/2019 ............. B62D 17/00 |

(Continued)

*Primary Examiner* — James A English

(57) ABSTRACT

A dual-mode active rear-wheel steering device, including: a steering angle control motor, a speed-reduction mechanism, a differential mechanism assembly, two steering motion conversion mechanisms, a first electromagnetic clutch and a second electromagnetic clutch. An output end of the steering angle control motor is connected to the speed-reduction mechanism. The differential mechanism assembly is a bevel gear differential, in which center holes at outer ends a two half shafts are respectively provided with a raceway to form an inner cyclical ball-lead screw-nut pair with a first lead screw and a second lead screw of the steering motion conversion mechanisms. The first lead screw and the second lead screw are the same in parameters but with opposite rotation direction. The first electromagnetic clutch controls connection between a differential housing and a frame. The second electromagnetic clutch controls connection between the differential housing and the second half shaft.

12 Claims, 4 Drawing Sheets

(56)     References Cited

U.S. PATENT DOCUMENTS

| | | | | |
|---|---|---|---|---|
| 12,264,731 B2 * | 4/2025 | Aulin | ....................... | B60K 1/00 |
| 2017/0059023 A1 * | 3/2017 | Severinsson | ......... | B60K 17/165 |
| 2019/0283578 A1 * | 9/2019 | Wang | .................. | B60K 17/346 |
| 2022/0410684 A1 * | 12/2022 | Wang | ..................... | B60K 23/04 |
| 2023/0106423 A1 * | 4/2023 | Wang | ..................... | B62D 7/226 |
| | | | | 180/445 |
| 2023/0143681 A1 * | 5/2023 | Cao | ........................ | F16H 48/24 |
| | | | | 475/160 |

FOREIGN PATENT DOCUMENTS

| | | | | |
|---|---|---|---|---|
| CN | 111232052 A | 6/2020 | | |
| CN | 112046201 B | * 9/2024 | ........... | B60K 17/165 |

* cited by examiner

DUAL-MODE ACTIVE REAR-WHEEL STEERING DEVICE BASED ON DIFFERENTIAL PRINCIPLE

CROSS-REFERENCE TO RELATED APPLICATIONS

This application claims the benefit of priority from Chinese Patent Application No. 202210001614.6, filed on Jan. 4, 2022. The content of the aforementioned application, including any intervening amendments thereto, is incorporated herein by reference in its entirety.

TECHNICAL FIELD

This application relates to automotive steering, and more particularly to a dual-mode active rear-wheel steering device based on differential principle.

BACKGROUND

Compared with traditional front-wheel steering, four-wheel steering can also control the rear-wheel steering in addition to controlling the front-wheel steering. The four-wheel steering system features an ability to independently control a lateral force of rear wheels. The rear-wheel compliance steering technique, such as programmed self-steering system (PSS) of Citroen, realizes the rear-wheel passive steering through the lateral deformation of a suspension, which improves the steering performance of vehicles under different conditions. Whereas, this technique cannot actively regulate the steering angle of the rear wheels, and is thus limited in the vehicle performance improvement. By comparison, the active rear-wheel steering technique can actively control the rear-wheel steering angle to adjust the driving state according to vehicle state information fed back during driving (such as speed, yaw rate and sideslip angle), leading to flexible low-speed steering, stable high-speed driving and safe braking. Due to the presence of the rear-wheel steering control, the four-wheel steering vehicles are superior to traditional front-wheel steering vehicles in vehicle performance, steering response, and driving safety and control.

In view of the great potential in improving the vehicle steering and active safety, the active rear-wheel steering has been extensively investigated, and applied to various commercially-available high-end models. For example, Cadillac CT6 uses an active rear-wheel steering system (ARS), in which a servo motor cooperates with a multi-link suspension to reach a rear-wheel steering angle of up to 3.5°. Nevertheless, the active rear-wheel steering is achieved by a single actuator through a steering mechanism, that is, steering angles of two rear wheels are determined by the rear-wheel steering trapezoid mechanism, and are not decoupled from each other. The active rear-wheel steering system developed by ZF Friedrichshafen AG adopts two drive motors respectively at left sand right sides to independently control steering angles of the two rear wheels, enabling the steering angle decoupling of the two rear wheels. This active rear-wheel steering system has been equipped in Porsche 911Turbo and 911GT3 to drive the two rear wheels to steer in the same direction and achieve a maximum rear-wheel steering angle of 3°.

The rear-wheel steering system can improve the steering performance of vehicles, enhancing the maneuverability under low-speed steering conditions and steering stability under high-speed driving conditions. Moreover, the active rear-wheel steering technique also can be used to enhance the directional stability during braking by controlling the two rear wheels to steer with opposite direction simultaneously. However, this technique is merely applied to Acura's precision all-wheel steering (PAWS) system, in which two distributed actuators are employed to respectively control the rear wheels to simultaneously turn inward by an angle, improving the directional stability when braking at high speed.

Though the Acura's PAWS system can improve the steering performance when cornering at different speed and directional stability when braking at high speed, the two independent steering motors will lead to high cost and poor system reliability. More seriously, once one steering motor fails and the other works normally, the vehicle will experience unstable and uncoordinated steering, which will easily cause an accident.

SUMMARY

In order to overcome the above-mentioned deficiencies in the existing rear-wheel steering techniques, the present disclosure provides a dual-mode active rear-wheel steering device based on differential principle, which allows the two rear wheels to deflect in the same or opposite direction based on the differential principle and selective control of an electromagnetic clutch. Therefore, this rear-wheel steering device has two operation modes, namely steering mode and braking mode. The steering of the two rear wheels is controlled by a single mechanism, which brings great reliability, and effectively decline the failure risk caused by excessive actuators. Furthermore, the steering system has simple structure, easy assembly and disassembly and high coaxial compactness, and thus is suitable for the practical application.

Technical solutions of this application are described as follows.

This application provides a dual-mode active rear-wheel steering device, comprising:

a housing assembly;

a steering angle control motor;

a speed-reduction mechanism;

a differential mechanism assembly;

a first half shaft;

a second half shaft;

a motion conversion mechanism;

a first electromagnetic clutch; and a second electromagnetic clutch;

wherein a housing of the steering angle control motor is fixedly provided at an end of the housing assembly; and the steering angle control motor is configured to drive rear wheels to steer and control a steering angle of the rear wheels;

the speed-reduction mechanism is configured to perform deceleration and torque increase on an input torque of the steering angle control motor;

the differential mechanism assembly is configured to transmit a motion input by the speed-reduction mechanism to a rear wheel at the other side;

the first half shaft is configured to drive a rear wheel at a first side to steer;

the second half shaft is configured to drive a rear wheel at a second side to steer;

the motion conversion mechanism is configured to convert a rotation of the first half shaft and a rotation of the second half shaft into a linear motion of a steering tie rod to push the rear wheels to steer;

the first electromagnetic clutch is arranged between the differential mechanism assembly and the speed-reduction mechanism; and the first electromagnetic clutch is configured to control connection between a differential housing of the differential mechanism assembly and the housing assembly; and the second electromagnetic clutch is arranged at a side of the differential mechanism assembly away from the first electromagnetic clutch; and the second electromagnetic clutch is configured to control connection between the differential housing of the differential mechanism assembly and the second half shaft.

In some embodiments, the housing assembly comprises a first housing and a second housing;

the first housing is configured to accommodate the speed-reduction mechanism and a first end of the motion conversion mechanism; and the second housing is configured to accommodate the differential mechanism assembly and the second electromagnetic clutch.

In some embodiments, the speed-reduction mechanism comprises an input gear and an output gear;

the input gear is rotatably supported in the housing assembly; and the input gear is coaxially connected to an output end of the steering angle control motor through a shaft coupling to transmit power; and the output gear is integrally formed with an outer end portion of the first half shaft; the output gear is rotatably supported in the housing assembly; and the output gear is engaged with the input gear for transmission.

In some embodiments, the differential mechanism assembly comprises the differential housing, a first half shaft gear, a second half shaft gear, a universal joint, a planetary gear, a first thrust gasket, a second thrust gasket and a spherical gasket;

the differential housing is coaxially and rotatably supported in the housing assembly; and the differential housing is configured to accommodate parts of the differential mechanism assembly;

the first half shaft gear is in splined connection with an inner end portion of the first half shaft;

the second half shaft gear is in splined connection with an inner end portion of the second half shaft;

the universal joint is fixedly provided inside the differential housing through a screw;

the planetary gear is rotatably sleeved on the universal joint, and is engaged with the first half shaft gear and the second half shaft gear for transmission;

the first thrust gasket is arranged between the first half shaft gear and the differential housing to adjust a gap between the first half shaft gear and the differential housing and reduce wear; the second thrust gasket is arranged between the second half shaft gear and the differential housing to adjust a gap between the second half shaft gear and the differential housing and reduce wear; and the spherical gasket is arranged between the planetary gear and the differential housing to reduce wear when the planetary gear rotates around the universal joint.

In some embodiments, the first electromagnetic clutch comprises a clutch housing, a first electromagnetic coil, an armature, a torque adjusting ring, a spring, a spring locating ring and a friction sheet;

one end of the clutch housing is coaxially connected to the first housing through a first screw, and the other end of the clutch housing is coaxially connected to the second housing through a second screw;

the first electromagnetic coil is fixed inside a groove of the clutch housing;

the armature is slidably sleeved on a portion of the differential housing extending out from the second housing by splined connection;

the torque adjusting ring is threadedly connected to the first half shaft;

one end of the spring is supported in a groove of the torque adjusting ring, and the other end of the spring is fixedly connected to the armature;

the spring locating ring is circumferentially fixed to the first half shaft with a wedge key; and the friction sheet is fixedly mounted on the housing assembly through a third screw.

In some embodiments, a first wire is directly connected to the first electromagnetic coil of the first electromagnetic clutch from an outside of a clutch housing of the first electromagnetic clutch; and when the first electromagnetic coil is in a de-energized state, the armature is pressed against the friction sheet under the action of the spring to lock the differential housing with the housing assembly; and when the first electromagnetic coil is in an energized state, the first electromagnetic coil generates an electromagnetic force to allow the armature to slide axially away from the friction sheet to enable the differential housing to rotate freely.

In some embodiments, the second electromagnetic clutch comprises a clutch housing, a second electromagnetic coil, an armature, a torque adjusting ring, a plurality of springs, a spring locating ring and a friction sheet;

the clutch housing is bolted and coaxially connected to the differential housing;

and the clutch housing is configured to be rotatable around its own axis with the differential housing;

the second electromagnetic coil is fixed inside a groove of the clutch housing;

the armature is slidably sleeved on the second half shaft by splined connection;

the torque adjusting ring is threadedly connected to the second half shaft;

one end of each of the plurality of springs is supported in a groove of the torque adjusting ring, and the other end of each of the plurality of springs is fixedly connected to the armature;

the spring locating ring is circumferentially fixed to the second half shaft with a wedge key; and the spring locating ring is axially provided with a through hole configured for locating the plurality of springs; and the friction sheet is mounted on the clutch housing through a screw.

In some embodiments, a second wire is connected to the second electromagnetic coil of the second electromagnetic clutch from a slip ring at an end of the clutch housing of the second electromagnetic clutch going through the housing assembly; and the second wire is configured to supply electric power to the second electromagnetic clutch; and when the second electromagnetic coil is in a de-energized state, the armature is pressed against a tail end of a splined portion of the second half shaft under the action of the plurality of springs to enable the second half shaft to rotate freely; and when the second electromagnetic clutch is in an energized state, the second electromagnetic coil generates an electromagnetic force to press the armature on the friction sheet fixed on the clutch housing, such that the second half shaft and the clutch housing are fixedly connected, and the second half shaft rotates synchronously with the clutch housing.

In some embodiments, the motion conversion mechanism comprises a first motion conversion mechanism and a second motion conversion mechanism; and the first motion conversion mechanism is configured to control a steering angle of the rear wheel at the first side, and the second motion conversion mechanism is configured to control a steering angle of the rear wheel at the second side.

In some embodiments, the first motion conversion mechanism comprises a first lead screw, a first steering tie rod and a dust-proof cover;

an inner end of the first lead screw is configured to fit a cyclical ball raceway at a central inner hole at an outer end portion of the first half shaft through a group of first balls to form a first inner cyclical ball-lead screw-nut pair, such that a rotational motion of the first half shaft is converted into a linear motion of the first lead screw;

one end of the first steering tie rod is connected to an outer end of the first lead screw through a first ball pin, and the other end of the first steering tie rod is connected to a steering knuckle arm of the rear wheel at the first side through a second ball pin, thereby dragging the rear wheel at the first side to steer;

the dust-proof cover is sleevedly provided on the first lead screw, and the first lead screw is provided at an outer side of the housing assembly; two ends of the dust-proof cover are fixed to the housing assembly and the first lead screw through a clamp, respectively;

In some embodiments, the second motion conversion mechanism comprises a second lead screw and a second steering tie rod;

an inner end of the second lead screw is configured to fit a cyclical ball raceway at a central inner hole at an outer end portion of the second half shaft through a group of second balls to form a second inner cyclical ball-lead screw-nut pair, such that a rotational motion of the second half shaft is converted into a linear motion of the second lead screw; and one end of the second steering tie rod is connected to an outer end of the second lead screw through a third ball pin, and the other end of the second steering tie rod is connected to a steering knuckle arm of the rear wheel at the second side through a fourth ball pin, thereby dragging the rear wheel at the second side to steer.

In some embodiments, the first lead screw and the second lead screw are the same in parameters except rotation direction, and a rotation direction of the first lead screw is opposite to a rotation direction of the second lead screw.

In some embodiments, the differential mechanism assembly is configured to be switched between two modes under control of the first electromagnetic clutch and the second electromagnetic clutch; and motions of the differential housing, the first half shaft and the second half shaft satisfy the following equation:

$$n_1+n_2=2n_0;$$

wherein $n_1$ stands for rotation speed of the first half shaft; $n_2$ stands for rotation speed of the second half shaft; and no stands for rotation speed of the differential housing.

In some embodiments, when the first electromagnetic clutch and the second electromagnetic clutch are both in the de-energized state, the differential housing and the housing assembly are fixedly connected by the action of the first electromagnetic clutch, such that the rotation speed of the differential housing $n_0$=0 rad/s, that is, the rotation speed $n_1$ of the first half shaft and the rotation speed $n_2$ of the second half shaft satisfy the following equation:

$$n_1+n_2=0;$$

in this case, the first half shaft and the second half shaft have the same rotation speed with opposite rotational direction, that is, the first lead screw and the second lead screw have the same motion direction and motion displacement; and two rear wheels have the same steering direction, which is named steering mode.

In some embodiments, when the first electromagnetic clutch and the second electromagnetic clutch are both in the energized state, the differential housing and the housing assembly are disconnected, such that the differential housing is rotatable; the differential housing and the second half shaft are fixedly connected, such that motions of the differential housing, the rotation speed of the first half shaft and the rotation speed of the second half shaft satisfy the following equations:

$$n_1+n_2=2n_0; \text{ and}$$

$$n_2=n_0;$$

and further $n_1=n_2=n_0$;

the first half shaft and the second half shaft have the same rotation speed with the same rotational direction, that is, the first lead screw and the second lead screw have opposite motion direction and the same motion displacement; and the rear wheels at opposite side respectively have opposite steering directions, which is named a braking mode.

In some embodiments, when first electromagnetic clutch is in the de-energized state and the second electromagnetic clutch is in the energized state, the differential housing, the housing assembly and the second half shaft are fixedly connected, such that the rotation speed of the differential housing, the rotation speed of the first half shaft and the rotation speed of the second half shaft satisfy the following equation:

$$n_1=n_2=n_0=0\text{rad}/s;$$

the rotation speed of the first half shaft, the rotation speed of the second half shaft and the rotation speed of the differential housing are zero, that is, the dual-mode active rear-wheel steering device is locked in an upright initial position to be prevented from rear-wheel forced-steering caused by external disturbances.

Compared to the prior art, this application has the following beneficial effects.

1. The dual-mode active rear-wheel steering device provided herein adopts a series of electro-mechanical actuators to control the vehicle operation under the steering mode and the braking mode. Compared with the existing active rear-wheel steering devices that only improves steering characteristics during the steering operation, the dual-mode active rear-wheel steering device provided herein can also improve the braking performance and safety of the vehicle.

2. This application employs a modified differential and two electromagnetic clutches to realize the dual-mode steering. Moreover, the gear is integrally formed with the half shaft to simplify the structure and reduce the system volume. The split-type housing facilitates the disassembly and maintenance.

3. This application enables two rear wheels to steer in the same direction under common steering conditions when two electromagnetic clutches are in a de-energized state, which contributes to less energy consumption under the steering mode. Meanwhile, since the steering operation is dependent on the mechanical structure, the system reliability is enhanced.

4. Compared to the strategy adopting two motors to respectively drive the two rear wheels, this application merely adopts a single motor to realize two operation modes, reducing the system complexity, as well as avoiding uncoordinated steering action in the case that one motor works normally while the other fails.

5. The self-locking of the dual-mode active rear-wheel steering device is controlled by two electromagnetic clutches, thereby avoiding shaking and vibration of rear wheels when travelling on uneven roads or suffering impact of obstacles, and improving the overall safety and reliability.

DETAILED DESCRIPTION OF EMBODIMENTS

Technical solutions of the present disclosure will be described below with reference to the accompany drawings and embodiments to facilitate the understanding.

Figure 1:
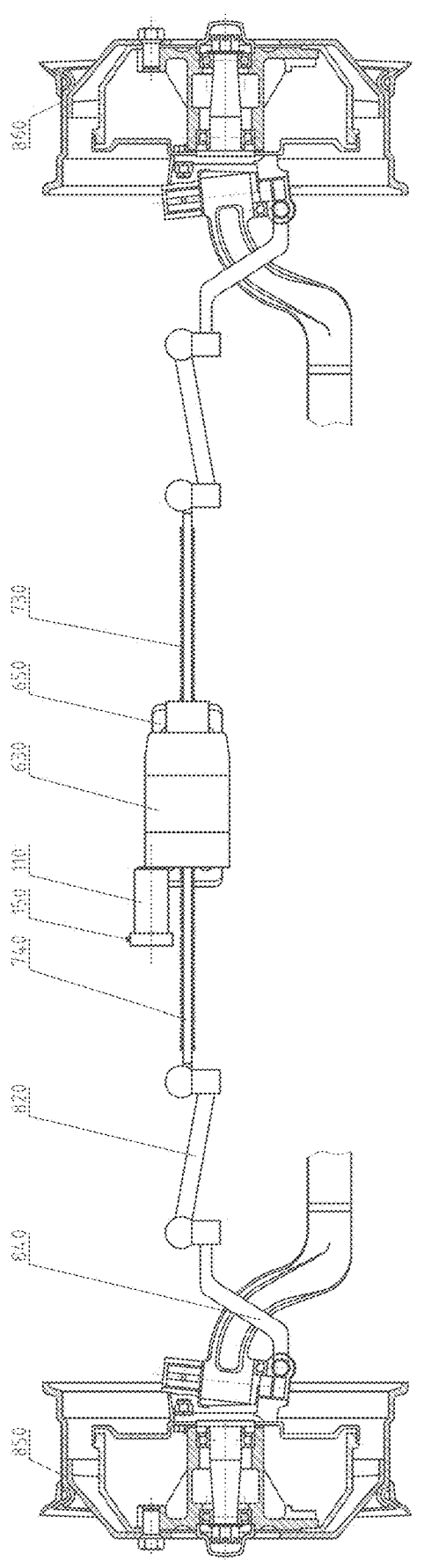
FIG. 1 structurally shows a dual-mode active rear-wheel steering device according to an embodiment of the present disclosure.

Illustrated in FIG. 1 is a dual-mode active rear-wheel steering device based on differential principle, which includes a steering angle control motor 110, a speed-reduction mechanism, a differential mechanism assembly, a first electromagnetic clutch, a second electromagnetic clutch and a motion conversion mechanism. A housing assembly 630 is mounted on a rear axle subframe of a vehicle through a mounting base 650. An axis of the housing assembly is perpendicular to an xy-plane in a vehicle coordinate system. The steering angle control motor 110 is mounted on the housing assembly 630 through a mounting flange 140. An axis of the steering angle control motor 110 is parallel to an axis of the housing assembly 630. A motor shaft 130 is connected to an input shaft 260 through a shaft coupling 220. A pinion gear 250 is arranged on the input shaft 260 by a key connection, such that power is transferred through the pinion gear to a gear wheel integrally formed by a first half shaft 340 in the differential mechanism assembly, so as to realize deceleration and torque increase. Under a steering mode, the first electromagnetic clutch 620 and the second electromagnetic clutch 410 are in a de-energized state, and a differential housing 310 of the differential mechanism assembly is fixed to the housing assembly 630, that is, the differential housing 310 is fixed, and a rotation speed n=0 rad/s. A second half shaft 360 is disconnected from the second electromagnetic clutch 410 fixed on the differential housing 310, thus the second half shaft 360 is capable of free rotation. Therefore, according to a differential principle $n_1 + n_2 = 2 \cdot n_0$, the first half shaft 340 and the second half shaft 360 have the same rotation speed with opposite rotation direction. The first half shaft 340, the second half shaft 360, a first lead screw 740 and a second lead screw 730 form an inner cyclical ball-lead screw-nut pair. The first lead screw 740 and the second lead screw 730 are the same in parameters expect a rotation direction, that is, a rotation direction of the first lead screw 740 is opposite to a rotation direction of the second lead screw 730. The inner cyclical ball-lead screw-nut pair is configured to convert a rotational motion of the steering angle control motor 110 into a linear motion. The first lead screw 740 and the second lead screw 730 move in the same direction and have equal motion displacement. Regarding the traditional vehicles with front-wheel steering, a rear suspension is provided with a rear-wheel toe-in control arm to adjust a toe-in angle of each rear wheel. In view of this, the connection between the rear-wheel toe-in control arm and the frame can be replaced with the connection between the rear-wheel toe-in control arm and an output end of the motion conversion mechanism through a ball pin, such that the linear motion of the output end of the motion conversion mechanism, which is also the lead screw of the inner cyclical ball-lead screw-nut pair, drives two rear wheels to perform active steering, therefore, the vehicles with front-wheel steering can perform active rear-wheel steering. Meanwhile, since the rear wheels participate in motion of steering system and suspension system, pin-shaft connection between control arm and wheels is changed to ball-pin connection between a steering tie rod 820 and a steering knuckle arm 840, so as to prevent motion interference between steering motion and suspension motion. In consequence, a first output end of the motion conversion mechanism, namely the first lead screw, is connected to a steering tie rod 820 of a rear wheel 850 at a first side; and a second output end of the motion conversion mechanism, namely the second lead screw, is connected to a steering tie rod 820 of a rear wheel 860 at a second side. The linear motion of the first lead screw and that of the second first lead screw drive the tie rod to perform a linear motion, such that the steering knuckle arm rotates around a main pin, and the two rear wheels can steer.

Figure 2:
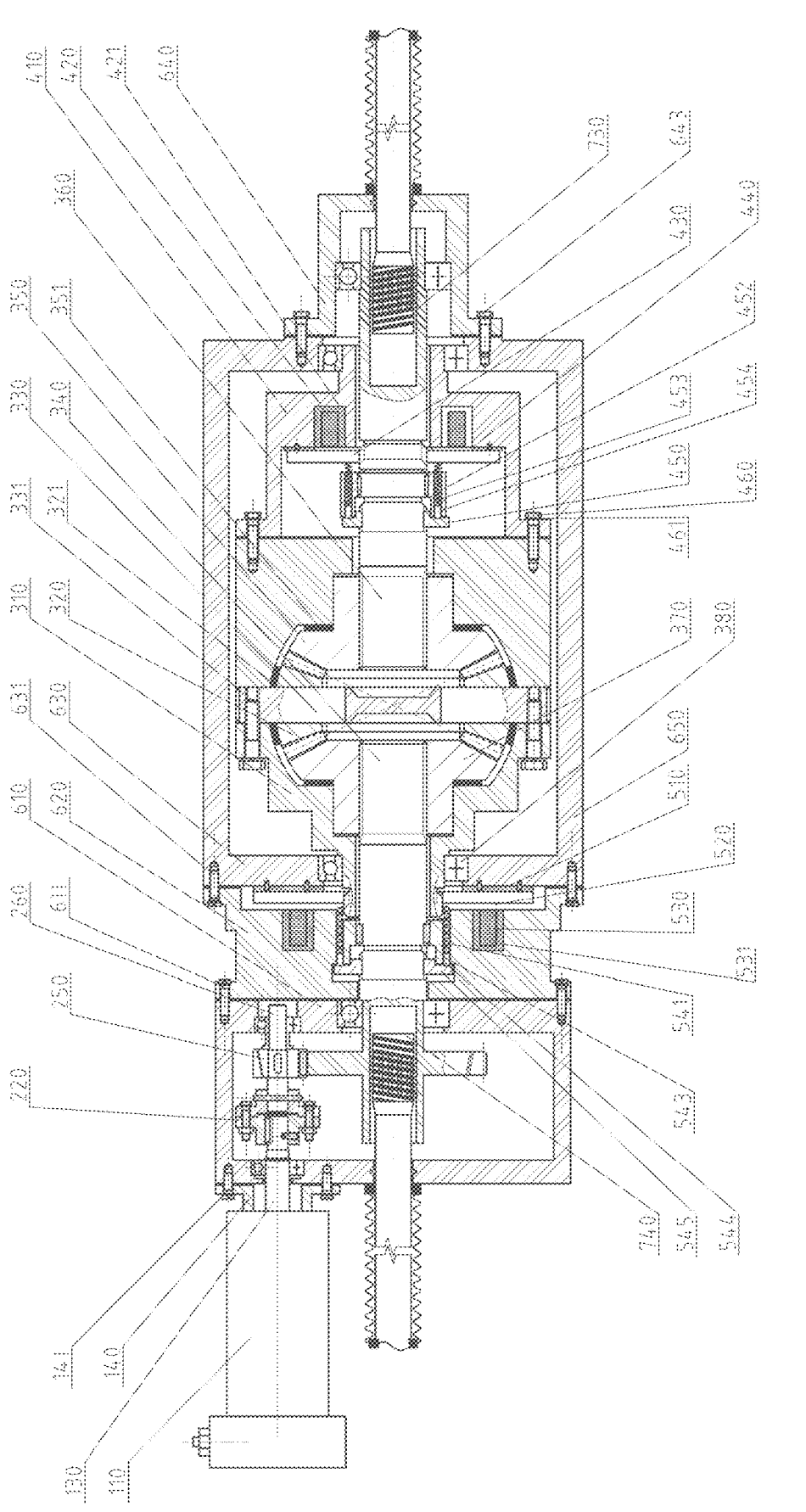
FIG. 2 is a sectional view of the dual-mode active rear-wheel steering device according to an embodiment of the present disclosure.
Figure 3:
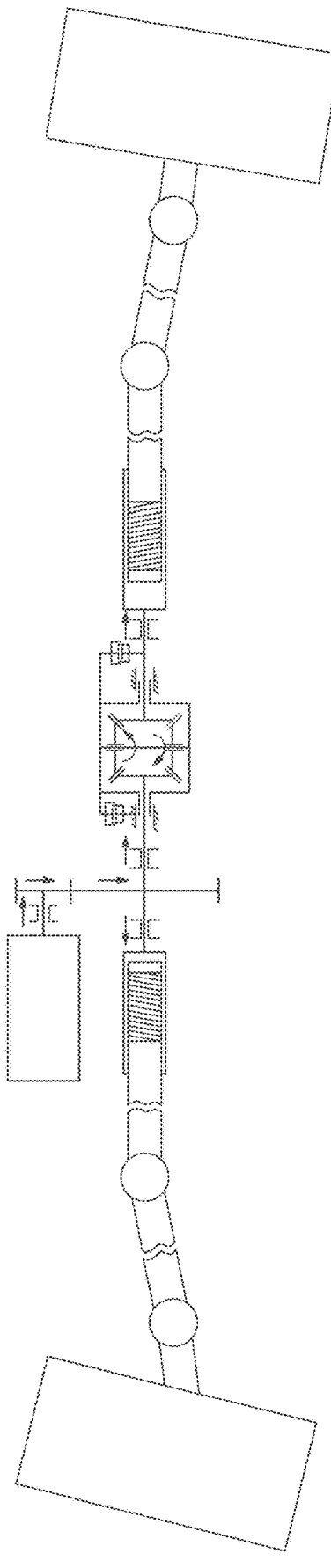
FIG. 3 schematically illustrates motion state of the dual-mode active rear-wheel steering device according to an embodiment of the present disclosure under a steering mode.
Figure 4:
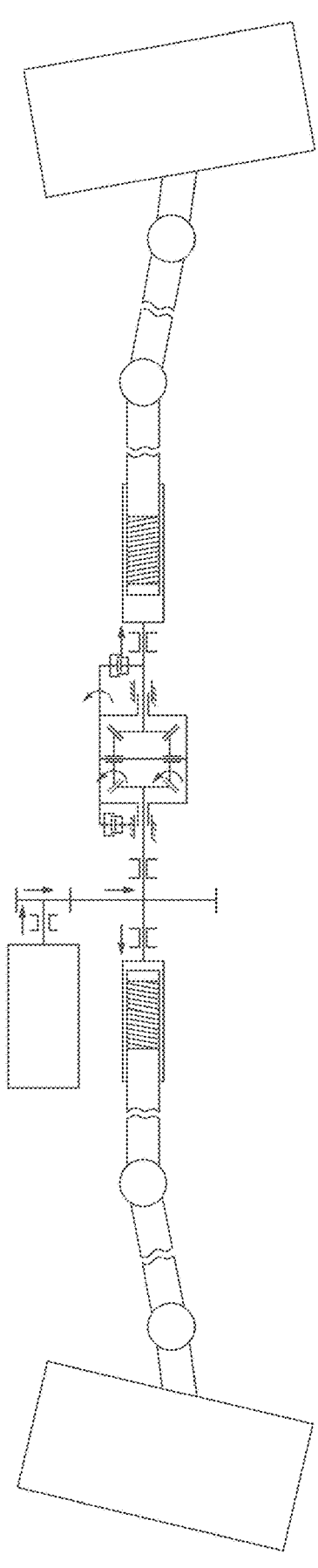
FIG. 4 schematically illustrates motion state of the dual-mode active rear-wheel steering device according to an embodiment of the present disclosure under a braking mode.

As shown in FIG. 2, the dual-mode active rear-wheel steering device includes the steering angle control motor 110, the speed-reduction mechanism, the differential mechanism assembly, the first electromagnetic clutch, the second electromagnetic clutch, the motion conversion mechanism and the housing assembly 630. The housing assembly 630 is a sectional type housing, including a first housing 610, a second housing 650 and an end cover 640. The first housing 610 is configured to accommodate a motor shaft, an input shaft, a shaft coupling and the speed-reduction mechanism, in which the shaft coupling is configured to connect the motor shaft and the input shaft. The second housing 650 is configured to accommodate the differential mechanism assembly and the second electromagnetic clutch. The end cover 640 is configured to accommodate the motion conversion mechanism. The first housing 610, the second housing 650 and the end cover 640 are successively connected through a first connecting screw 611, a second connecting screw 631, a third connecting screw 643 and gaskets corresponding to the three connecting screws.

The steering angle control motor is configured to drive rear wheels to steer and control a steering angle of the rear wheels. The steering angle should be control with fast response speed, precise and controllable angle, and a change of the steering angle should be as smooth as possible to avoid sudden shake of vehicle. Accordingly, the steering angle control motor has a two-way operation function, a precise and controllable rotation angle, smooth operation, fast execution speed, great reliability, as well as a compact structure and convenient layout. Preferably, the steering angle control motor is a direct current (DC) servo motor 110. A motor terminal 150 is configured to provide a DC power supply and a corresponding control signal to the DC servo motor 110.

As shown in FIGS. 1-2, an output end of the steering angle control motor is provided with a mounting flange 140. The steering angle control motor 110 is fixed on the first housing 610 though a connecting bolt 141 and a gasket, and an axis of the steering angle control motor 110 is parallel to an axis of the first housing 610. The motor shaft 130 of the steering angle control motor 110 is connected to the input shaft 260 of the speed-reduction mechanism through the shaft coupling 220, so as to achieve power transmission.

As shown in FIG. 2, the input shaft 260 of the speed-reduction mechanism includes the pinion gear 250. The pinion gear 250 is fixed on the input shaft 260 by key connection. Deceleration and torque increase can be realized through the gear wheel. In an embodiment, the gear wheel is integrally formed with the first half shaft 340 in the differential mechanism assembly, that is, power output by the steering angle control motor 110 is subjected to deceleration and then directly transmitted to the first half shaft 340. The first half shaft 340 is in splined connection with a first half shaft gear, such that the power output by the steering angle control motor 110 directly acts on the first half shaft gear of the differential mechanism assembly. The first electromagnetic clutch and the second electromagnetic clutch are controlled to be in a disengaged or energized state, so as to control a power flow process in the differential mechanism assembly to realize the steering mode and the braking mode.

As shown in FIG. 2, the traditional bevel gear differential is modified to obtain the differential mechanism assembly. The differential mechanism assembly includes a differential housing 310, a first half shaft 340, a first half shaft gear 370, four spur bevel planetary gears 320, a universal joint 330, a fourth connecting screw 331, a second half shaft 360. a second half shaft gear 350, a spherical gasket 321 and a thrust gasket 351. Four shaft journals of the universal joint 330 are respectively embedded in four grooves of the differential housing 310. The four spur bevel planetary gears 320 are sleevedly provided on the four shaft journals of the universal joint 330, respectively. The four spur bevel planetary gears 320 are engaged with the first half shaft gear 370 and the second half shaft gear 350. A shaft journal of the first half shaft gear 370 is supported in a hole at a first side of the differential housing 310; and a shaft journal of the second half shaft gear 350 is supported in a hole at a second side of the differential housing 310. The first half shaft gear 370 is in splined connection with the first half shaft 340. The second half shaft gear 350 is in splined connection with the second half shaft 360.

As shown in FIG. 2, a clutch housing of the second electromagnetic clutch 410 and a corresponding gasket 461 are fixed on the differential housing 310 through a fifth connecting screw 460. The differential housing 310 and the clutch housing of the second electromagnetic clutch 410 are mounted in the second housing 650 through a pair of angular contact ball bearings 380. A power supply line of the second electromagnetic clutch 410 is connected from a slip ring at an end of the differential housing 310 through the second housing 650. The first electromagnetic clutch 620 is configured to control the connection between the differential housing 310 and the housing assembly 630. When the first electromagnetic clutch 620 is in a de-energized state, the differential housing 310 and the housing assembly 630 are fixedly connected, that is, the differential housing 310 is not rotatable. When the first electromagnetic clutch 620 is in an energized state, the differential housing 310 and the housing assembly 630 are disconnected, that is, the differential housing 310 is rotatable in the housing assembly 630.

As shown in FIG. 2, the first electromagnetic clutch 620 mainly includes a clutch housing, a first torque adjusting ring 545, a first spring supporting base 544, a first spring locating ring 543, a first spring 541, a first friction sheet 510, a first armature 520, a first magnet yoke 531 and a first electromagnetic coil 530. As shown in FIG. 2, the clutch housing of the first electromagnetic clutch 620 is fixed on the housing assembly 630 through the second connecting screw 631 and a corresponding gasket. In an embodiment, six second connecting screws 631 are evenly and circumferentially distributed. The first magnet yoke 531 and the first electromagnetic coil 530 are fixed on the clutch housing of the first electromagnetic clutch 620.

In an embodiment, the first torque adjusting ring 545 is axially and threadedly fixed on the first half shaft 340, that is, a corresponding connecting portion of the first half shaft 340 has external thread to allow the first torque adjusting ring 545 to rotate on the first half shaft 340. In an embodiment, the first spring locating ring 543 is circumferentially fixed to the first half shaft 340 with a wedge key. The first spring locating ring 543 and the clutch housing of the first electromagnetic clutch 620 work together to circumferentially locate the first spring 541. In an embodiment, one end of the first spring 541 is supported on the first spring supporting base 544, in which the first spring supporting base 544 is arranged at a groove of the first torque adjusting ring 545; and the other end of the first spring 541 presses against the first armature 520. As shown in FIG. 2, a portion of the differential housing 310 extending out from the second housing 650 is also a part of the first electromagnetic clutch 620. The portion of the differential housing 310 extending out from the second housing 650 is provided with spline grooves, and is in splined connection with the first armature 520, such that the first armature 520 can axially slid on the portion of the differential housing 310. In an embodiment, the first friction sheet 510 is fixed on the second housing 650 through connecting screws arranged evenly and circumferentially, and a power supply line of the first electromagnetic clutch 620 is directly connected from the clutch housing of the first electromagnetic clutch 620.

In an embodiment, referring to FIG. 2, when the first electromagnetic clutch 620 is in a de-energized state, the first armature 520 is pressed against the first friction sheet 510 of the second housing 650 under the action of the first spring 541 to lock the differential housing 310. When the first electromagnetic clutch 620 is in an energized state, the first electromagnetic coil 530 generates an electromagnetic force to allow the first armature 520 to slide axially along a splined portion of the portion of the differential housing 310 extending out from the second housing 650. Then, the first armature 520 presses against a tail end of the splined portion to disconnect the second housing 650 and the differential housing 310 to enable the differential housing 310 is to rotate freely.

In an embodiment, the first torque adjusting ring 545, which is threadedly connected to the first half shaft 340, can rotate to change an initial pression of the first spring 541 to change a pre-tightening torque of the electromagnetic clutch. Consequently, a reduction of operating torque of the electromagnetic clutch of the dual-mode active rear-wheel steering device due to gradual wear of the friction sheet during operation can be overcome, leading to more reliable the dual-mode active rear-wheel steering device.

As shown in FIG. 2, the second electromagnetic clutch 410 mainly includes the clutch housing, a second torque adjusting ring 450, a second spring supporting base 454, a second spring locating ring 452, a second spring 453, a second friction sheet 440, a second armature 430, a second electromagnetic coil 420 and a second magnet yoke 421. Connections between the parts of the second electromagnetic clutch 410 are almost similar to those of the first electromagnetic clutch 620. Differences are that the clutch housing of the second electromagnetic clutch 410 is fixedly connected to the differential housing 310 through the fifth connecting screw 460 and a corresponding gasket; and the second friction sheet 440 is fixed on the clutch housing of the second electromagnetic clutch 410 through connecting screws arranged evenly and circumferentially. In an embodiment, the second armature 430 is slidably sleeved on the second half shaft 360 by splined connection. The power supply line of the second electromagnetic clutch 410 is connected from a slip ring at an end of the clutch housing of the second electromagnetic clutch 410 through the housing assembly 630. When the second electromagnetic clutch 410 is in a de-energized state, the second armature 430 is allowed to axially move along a splined portion of the second half shaft 360, and is pressed against a tail end of splined portion of the second half shaft 360 under the action of the second spring 453, such that the second half shaft 360 and the second electromagnetic clutch 410 are disconnected, and the second half shaft 360 is rotatable. When the second electromagnetic clutch 410 is in an energized state, the second electromagnetic coil 420 generates electromagnetic force to press the second armature 430 on the second friction sheet 440 fixed on the clutch housing of the second electromagnetic clutch 410, such that the second half shaft 360 and the second electromagnetic clutch 410 are fixedly connected, that is, the second half shaft 360 410 rotates in the same rotation speed with the second electromagnetic clutch.

As shown in FIG. 2, the motion conversion mechanism converts motions through the inner cyclical ball-lead screw-nut pair, that is, a rotational motion of the steering angle control motor is converted into a linear motion of a lead screw of the motion conversion mechanism, such that the steering tie rod is driven to perform a linear motion, and the control of the steering angle of rear wheel is achieved.

In an embodiment, the first lead screw 740 and the second lead screw 730 are the same in parameters except the rotation direction. Therefore, the dual-mode active rear-wheel steering device operates at a common steering mode when the first electromagnetic clutch and the second electromagnetic clutch are in the de-energized state, that is, the rear wheels steer in the same direction during operation, which is energy-saved, environmentally friendly and reliable.

As shown in FIG. 2, an output end of the first half shaft 340 and that of the second half shaft 360 have a drill way, which is a nut part of the inner cyclical ball-lead screw-nut pair. Inside the drill way is provided with an inner cyclical raceway, such that a ball can cyclically roll. A screw part of the inner cyclical ball-lead screw-nut pair is provided with a ring groove for the cyclically rolling of the ball, and forms the inner cyclical ball-lead screw-nut pair with the first half shaft and the second half shaft. In an embodiment, a portion of the first half shaft 340 and that of the second half shaft 360 extending out from the housing assembly 630 are provided with a felt ring for sealing. A dust-proof cover is configured for further sealing, in which one end of the dust-proof cover is fixed on the lead screw and the other end of the dust-proof cover is fixed on the housing assembly 630, such that the rear-wheel steering device is prevent from dust and pollution.

The dual-mode active rear-wheel steering device provided herein can realize the steering mode and the braking mode. When driving on a rough road, the dual-mode active rear-wheel steering device can be self-locked to avoid shaking vibration of rear wheels due to road impact.

The working principle of the dual-mode active rear-wheel steering device is described below.

Under the steering mode, the first electromagnetic clutch 620 is in the de-energized state. The first armature 520 is pressed on the first friction sheet 510 of the second housing 650 under the action of the first spring 541 to lock the differential housing 310. In this case, a rotation speed of the differential housing 310 $n_0=0$ rad/s. The second electromagnetic clutch 410 is also in the de-energized state. The second armature 430 is allowed to axially move along the splined portion of the second half shaft 360, and is pressed against the tail end of the splined portion of the second half shaft 360 under the action of the second spring 453, such that the second half shaft 360 and the second electromagnetic clutch 410 are disconnected, and the second half shaft 360 is rotatable. The first half shaft 340, the second half shaft 360 and the differential housing 310 satisfy the following equation:

$$n_1+n_2=2*n_0 \tag{1}$$

where $n_1$ is a rotation speed of the first half shaft 340; $n_2$ is a rotation speed of the second half shaft 360; and no is a rotation speed of the differential housing 310.

Under the steering mode, the rotation speed of the differential housing 310 $n_0=0$ rad/s, and the first half shaft 340 and the second half shaft 360 satisfy the following equation:

$$n_1+n_2=0 \tag{2}.$$

Regarding the differential mechanism assembly, the differential housing 310 and the universal joint 330 are fixed. The spur bevel planetary gear 320 rotates around an axis thereof. The first half shaft gear 370 and the second half shaft gear 350 have the same rotation speed and opposite rotational direction, that is, the first half shaft 340 and the second half shaft 360 have the same rotation speed and opposite rotational direction. Since the first lead screw 740 and the second lead screw 730 have opposite rotational direction, for the motion conversion mechanism, the first lead screw 740 and the second lead screw 730 have the same motion direction and motion displacement. Therefore, the linear motion of the first lead screw 740 and the second lead screw 730 drives the steering tie rod to perform a linear motion, so as to allow the steering knuckle arms of the rear wheels to rotate in the same rotational direction. Consequently, the rear wheels have the same steering direction.

Under the braking mode, the first electromagnetic clutch 620 is in an energized state. The first electromagnetic coil 530 generates an electromagnetic force to allow the first armature 520 to slide axially along the splined portion of the shaft portion of the differential housing 310 extending out from the second housing 650. Then, the first armature 520 is pressed on the tail end of the splined portion to disconnect the second housing 650 and the differential housing 310 to enable the differential housing 310 to rotate freely. In this case, the second electromagnetic clutch 410 is also in a de-energized state. The second electromagnetic coil 420 generates an electromagnetic force to allow the second armature 430 to press on the second friction sheet 440 fixed on the clutch housing of the second electromagnetic clutch 410, such that the second half shaft 360 and the second electromagnetic clutch 410 are fixedly connected, that is, the second half shaft 360 and the second electromagnetic clutch 410 rotate in the same rotation speed. At this time, the rotation speed of the first half shaft 340 $n_1$, the rotation speed of the second half shaft 360 $n_2$ and the rotation speed of the differential housing 310 satisfy the following equation:

$$n_1=n_2=n_0 \qquad (3).$$

Regarding the differential mechanism assembly, the differential housing 310 and the universal joint 330 rotate around an axis of the differential housing 310. The spur bevel planetary gear 320 not only revolves on its own axis, but revolves around the axis of the differential housing 310. The first half shaft gear 370 and the second half shaft gear 350 have the same rotation speed and rotational direction, that is, the first half shaft 340 and the second half shaft 360 have the same rotation speed and rotational direction. Unfortunately, since the first lead screw 740 and the second lead screw 730 have opposite rotational direction, for the motion conversion mechanism, the first lead screw 740 and the second lead screw 730 have opposite motion direction and the same motion displacement. Therefore, the linear motion of the first lead screw 740 and that of the second lead screw 730 drive the tie rod to perform a linear motion, so as to allow the steering knuckle arms of two rear wheels to rotate in opposite rotational directions. Consequently, the two rear wheels have opposite steering directions, that is, two rear wheels simultaneously steer an angle towards an inside of the vehicle body.

Under a self-locking mode, the first electromagnetic clutch 620 is in the de-energized state. The first armature 520 is pressed on the first friction sheet 510 of the second housing 650 under the action of the first spring 541 to lock the differential housing 310 with the second housing 650, that is, the rotation speed of the differential housing 310 $n_0=0$ rad/s. Meanwhile, the second electromagnetic clutch 410 is in the energized state. The second electromagnetic coil 420 generates an electromagnetic force to press the second armature 430 on the second friction sheet 440 fixed on the clutch housing of the second electromagnetic clutch 410, such that the second half shaft 360 and the second electromagnetic clutch 410 are fixedly connected, that is, the second half shaft 360 is fixedly connected to the differential housing 310. Therefore, the rotation speed of the first half shaft 340 $n_1$, the rotation speed of the second half shaft 360 $n_2$ and the rotation speed of the differential housing 310 satisfy the following equation:

$$n_1+n_2=2n_0; \text{ and}$$

$$n_0=n_2=0 \text{ rad/}s;$$

and further, $n_1=n_2=n_0=0$ rad/$s$.

At this time, the differential housing 310 and the second half shaft 360 are locked with the second housing 650, that is, the dual-mode active rear-wheel steering device is locked in an upright initial position, which prevents the rear wheels from swaying when driving on an uneven road or encountering obstacles, avoiding dangerous situations.

In summary, the dual-mode active rear-wheel steering device provided herein can at least realize the steering mode and the braking mode. In an embodiment, the dual-mode active rear-wheel steering device can realize self-locking mode to avoid dangerous situations. By controlling states of the two electromagnetic clutches, the above-mentioned operation modes can be achieved, which is shown in Table 1.

TABLE 1

| Operation modes of the dual-mode active rear-wheel steering device | | | |
|---|---|---|---|
| | Steering mode | Braking mode | Self-locking mode |
| First electromagnetic clutch | De-energized state | Energized state | De-energized state |
| Second electromagnetic clutch | De-energized state | Energized state | Energized state |

In an embodiment, the bevel gear differential is replaced with a cylindrical gear differential. Dual-mode rear-wheel active steering and self-locking are still achieved according to differential principle, thus not an innovation.

The dual-mode active rear-wheel steering device provided herein uses one motor to control steering angles of two rear wheels, so as to allow the two rear wheels to steer in the same direction or opposite direction according to driving situation, that is, the dual-mode active rear-wheel steering device has the steering mode and the braking mode. Furthermore, the dual-mode active rear-wheel steering device has the self-locking mode, which prevents the spontaneous steering and shaking vibration of the two rear wheels, ensuring the driving safety.

Described above are merely illustrative of the disclosure, and are not intended to limit the disclosure. Although the disclosure has been illustrated and described in detail above, it should be understood that those skilled in the art could still make modifications and changes to the embodiments of the disclosure. Those changes and modifications made by those skilled in the art based on the content disclosed herein without departing from the scope of the disclosure shall fall within the scope of the present disclosure defined by the appended claims.

What is claimed is:

1. A dual-mode active rear-wheel steering device, comprising:
   a housing assembly;
   a steering angle control motor;
   a speed-reduction mechanism;
   a differential mechanism assembly comprising a first half shaft and a second half shaft;
   a motion conversion mechanism;
   a first electromagnetic clutch; and
   a second electromagnetic clutch;
   wherein a housing of the steering angle control motor is fixedly provided at an end of the housing assembly; and
     the steering angle control motor is configured to drive rear wheels to steer and control a steering angle of the rear wheels;
   the speed-reduction mechanism is configured to perform deceleration and torque increase on an input torque of the steering angle control motor;
   the differential mechanism assembly is configured to transmit a motion input by the speed-reduction mechanism to the rear wheels;
   the first half shaft is configured to drive a rear wheel at a first side to steer;
   the second half shaft is configured to drive a rear wheel at a second side to steer;

the motion conversion mechanism is configured to convert a rotation of the first half shaft and a rotation of the second half shaft into a linear motion of a steering tie rod to push the rear wheels to steer;

the first electromagnetic clutch is arranged between the differential mechanism assembly and the speed-reduction mechanism; and the first electromagnetic clutch is configured to control connection between a differential housing of the differential mechanism assembly and the housing assembly;

the second electromagnetic clutch is arranged at a side of the differential mechanism assembly away from the first electromagnetic clutch; and the second electromagnetic clutch is configured to control connection between the differential housing of the differential mechanism assembly and the second half shaft; and the first electromagnetic clutch and the second electromagnetic clutch are configured to be engaged or disengaged to control the first half shaft and the second half shaft to move in the same or opposite direction to drive the rear wheels to perform different steering operations.

2. The dual-mode active rear-wheel steering device of claim 1, wherein the housing assembly comprises a first housing, a second housing and an end cover;

the first housing is configured to accommodate the speed-reduction mechanism and a first end of the motion conversion mechanism;

the second housing is configured to accommodate the differential mechanism assembly and the second electromagnetic clutch; and the end cover is configured to accommodate a second end of the motion conversion mechanism.

3. The dual-mode active rear-wheel steering device of claim 1, wherein the speed-reduction mechanism comprises an input gear and an output gear;

the input gear is rotatably supported in the housing assembly; and the input gear is coaxially connected to an output end of the steering angle control motor through a shaft coupling to transmit power; and the output gear is integrally formed with an outer end portion of the first half shaft; the output gear is rotatably supported in the housing assembly; and the output gear is engaged with the input gear for transmission.

4. The dual-mode active rear-wheel steering device of claim 1, wherein the differential mechanism assembly comprises the differential housing, a first half shaft gear, a second half shaft gear, a universal joint, a planetary gear, a first thrust gasket, a second thrust gasket and a spherical gasket;

the differential housing is coaxially and rotatably supported in the housing assembly; and the differential housing is configured to accommodate parts of the differential mechanism assembly;

the first half shaft gear is in splined connection with an inner end portion of the first half shaft;

the second half shaft gear is in splined connection with an inner end portion of the second half shaft;

the universal joint is fixedly provided inside the differential housing through a screw;

the planetary gear is rotatably sleeved on the universal joint, and is engaged with the first half shaft gear and the second half shaft gear for transmission;

the first thrust gasket is arranged between the first half shaft gear and the differential housing to adjust a gap between the first half shaft gear and the differential housing and reduce wear; the second thrust gasket is arranged between the second half shaft gear and the differential housing to adjust a gap between the second half shaft gear and the differential housing and reduce wear; and the spherical gasket is arranged between the planetary gear and the differential housing to reduce wear when the planetary gear rotates around the universal joint.

5. The dual-mode active rear-wheel steering device of claim 2, wherein the first electromagnetic clutch comprises a clutch housing, an electromagnetic coil, an armature, a torque adjusting ring, a spring, a spring locating ring and a friction sheet;

one end of the clutch housing is coaxially connected to the first housing through a first screw, and the other end of the clutch housing is coaxially connected to the second housing through a second screw;

the electromagnetic coil is fixed inside a groove of the clutch housing;

the armature is slidably sleeved on a portion of the differential housing extending out from the second housing by splined connection;

the torque adjusting ring is threadedly connected to the first half shaft;

one end of the spring is supported in a groove of the torque adjusting ring, and the other end of the spring is fixedly connected to the armature;

the spring locating ring is circumferentially fixed to the first half shaft with a wedge key;

the friction sheet is fixedly mounted on the housing assembly through a third screw; and when the electromagnetic coil is in a de-energized state, the armature is pressed against the friction sheet under the action of the spring to lock the differential housing with the housing assembly; and when the electromagnetic coil is in an energized state, the electromagnetic coil generates an electromagnetic force to allow the armature to slide axially away from the friction sheet to enable the differential housing to rotate freely.

6. The dual-mode active rear-wheel steering device of claim 1, wherein the second electromagnetic clutch comprises a clutch housing, an electromagnetic coil, an armature, a torque adjusting ring, a plurality of springs, a spring locating ring and a friction sheet;

the clutch housing is bolted and coaxially connected to the differential housing;

and the clutch housing is configured to be rotatable around its own axis with the differential housing;

the electromagnetic coil is fixed inside a groove of the clutch housing;

the armature is slidably sleeved on the second half shaft by splined connection;

the torque adjusting ring is threadedly connected to the second half shaft;

one end of each of the plurality of springs is supported in a groove of the torque adjusting ring, and the other end of each of the plurality of springs is fixedly connected to the armature;

the spring locating ring is circumferentially fixed to the second half shaft with a wedge key; and the spring locating ring is axially provided with a through hole configured for locating the plurality of springs;

the friction sheet is mounted on the clutch housing through a screw; and when the second electromagnetic clutch is in a de-energized state, the armature is pressed against a tail end of a splined portion of the second half shaft under the action of the plurality of springs to enable the second half shaft to rotate freely; and when the second electromagnetic clutch is in an energized state, the electromagnetic coil generates an electromagnetic force to press the armature on the friction sheet fixed on the clutch housing, such that the second half shaft and the differential housing are fixedly connected, and the second half shaft rotates synchronously with the differential housing.

7. The dual-mode active rear-wheel steering device of claim 1, wherein the motion conversion mechanism comprises a first motion conversion mechanism and a second motion conversion mechanism;

the first motion conversion mechanism comprises a first lead screw and a first steering tie rod;

an inner end of the first lead screw is configured to fit a cyclical ball raceway at a central inner hole at an outer end portion of the first half shaft through a group of first balls to form a first inner cyclical ball-lead screw-nut pair, such that a rotational motion of the first half shaft is converted into a linear motion of the first lead screw;

one end of the first steering tie rod is connected to an outer end of the first lead screw through a first ball pin, and the other end of the first steering tie rod is connected to a steering knuckle arm of the rear wheel at the first side through a second ball pin, thereby dragging the rear wheel at the first side to steer;

the second motion conversion mechanism comprises a second lead screw and a second steering tie rod;

an inner end of the second lead screw is configured to fit a cyclical ball raceway at a central inner hole at an outer end portion of the second half shaft through a group of second balls to form a second inner cyclical ball-lead screw-nut pair, such that a rotational motion of the second half shaft is converted into a linear motion of the second lead screw; and one end of the second steering tie rod is connected to an outer end of the second lead screw through a third ball pin, and the other end of the second steering tie rod is connected to a steering knuckle arm of the rear wheel at the second side through a fourth ball pin, thereby dragging the rear wheel at the second side to steer.

8. The dual-mode active rear-wheel steering device of claim 7, wherein the first lead screw and the second lead screw are the same in parameters except rotation direction, and a rotation direction of the first lead screw is opposite to a rotation direction of the second lead screw.

9. The dual-mode active rear-wheel steering device of claim 5, wherein a first wire is directly connected to the electromagnetic coil of the first electromagnetic clutch from an outside of a clutch housing of the first electromagnetic clutch; the first wire is configured to supply electric power to the first electromagnetic clutch; a second wire is connected to an electromagnetic coil of the second electromagnetic clutch from a slip ring at an end of a clutch housing of the second electromagnetic clutch going through the housing assembly; and the second wire is configured to supply electric power to the second electromagnetic clutch.

10. The dual-mode active rear-wheel steering device of claim 6, wherein a first wire is directly connected to an electromagnetic coil of the first electromagnetic clutch from an outside of a clutch housing of the first electromagnetic clutch; the first wire is configured to supply electric power to the first electromagnetic clutch; and a second wire is connected to the electromagnetic coil of the second electromagnetic clutch from a slip ring at an end of a clutch housing of the second electromagnetic clutch going through the housing assembly; and the second wire is configured to supply electric power to the second electromagnetic clutch.

11. The dual-mode active rear-wheel steering device of claim 3, wherein the input gear is rotatably supported in the housing assembly through a first angular contact ball bearing; and the output gear is rotatably supported in the housing assembly through a second angular contact ball bearing.

12. The dual-mode active rear-wheel steering device of claim 4, wherein the differential housing is coaxially and rotatably supported in the housing assembly through an angular contact ball bearing.

\*   \*   \*   \*   \*